(12) United States Patent
Manwaring et al.

(10) Patent No.: US 8,127,639 B2
(45) Date of Patent: Mar. 6, 2012

(54) SLEEVE BEARING FOR COLLAPSIBLE STEERING COLUMN

(75) Inventors: Marvin V. Manwaring, Clio, MI (US);
Richard K. Riefe, Saginaw, MI (US);
Ray G. Armstrong, Bay City, MI (US);
Ravi Ravindra, Saginaw, MI (US)

(73) Assignee: Steering Solutions IP Holding Company, a Delaware corporation, Saginaw, MI (US)

( * ) Notice: Subject to any disclaimer, the term of this patent is extended or adjusted under 35 U.S.C. 154(b) by 1425 days.

(21) Appl. No.: 11/204,505

(22) Filed: Aug. 16, 2005

(65) Prior Publication Data

US 2007/0039403 A1 Feb. 22, 2007

(51) Int. Cl.
*B62D 1/00* (2006.01)
*B62D 1/16* (2006.01)
*B62D 1/18* (2006.01)
*F16C 27/06* (2006.01)
*F16C 35/00* (2006.01)

(52) U.S. Cl. ............ 74/492; 74/493; 280/777; 384/222; 384/441

(58) Field of Classification Search .............. 74/492, 74/493; 280/775, 777; 403/365; 384/276, 384/300, 215, 42, 220–222; 464/162
See application file for complete search history.

(56) References Cited

U.S. PATENT DOCUMENTS 1,941,768 A * 1/1934 Vigne ........................ 384/282

(Continued)

FOREIGN PATENT DOCUMENTS

| DE | 10019249 A1 | 10/2000 |
|---|---|---|
| DE | 10343685 A1 | 4/2005 |
| EP | 0755843 A1 | 1/1997 |
| EP | 1669272 A3 | 11/2010 |

OTHER PUBLICATIONS

European Search Report dated Jul. 14, 2011 for European Application No. 06076362.0.

*Primary Examiner* — Vinh T. Luong
(74) *Attorney, Agent, or Firm* — Cantor Colburn LLP (57) ABSTRACT

A telescopically collapsible vehicular steering column assembly includes inner and outer shaft tubes which are joined in a sliding fit by a bushing. The bushing includes a pair of spaced journal bearings formed of steel-backed PTFE held in a plastic carrier body. The bushing is located in a receiving chamber in the outer shaft tube. A clearance compensator reacts against the receiving chamber to exert a radial compressive force through the carrier body and the journal bearings to improve the sliding fit with the inner shaft tube and remove lash. The clearance compensator can take any form, such as a hollow annular rib, a skirt with a flexible free end, or an array of nubs carried in thinned sections of the carrier body. The clearance compensator in all of these variations operates within a clearance space and has dimensional attributes which can be changed during the design and manufacturing phases of the bushing to optimize a characteristic of the steering column assembly. The optimized characteristic may be the sliding friction between the inner and outer shaft tubes, or the stiffness of the assembled column which affects its vibrational frequency, or other value.

21 Claims, 8 Drawing Sheets

U.S. PATENT DOCUMENTS

| | | | |
|---|---|---|---|
| 3,561,830 A * | 2/1971 | Orndorff | 384/98 |
| 3,781,073 A * | 12/1973 | Jorn et al. | 384/291 |
| 4,208,075 A * | 6/1980 | Templeton | 384/29 |
| 5,216,928 A * | 6/1993 | Kodachi | 74/422 |
| 5,413,414 A * | 5/1995 | Bauer | 384/276 |
| 5,590,565 A * | 1/1997 | Palfenier et al. | 74/493 |
| 5,669,718 A * | 9/1997 | Sakairi et al. | 384/220 |
| 5,722,300 A * | 3/1998 | Burkhard et al. | 74/493 |
| 5,758,545 A * | 6/1998 | Fevre et al. | 74/493 |
| 5,964,536 A * | 10/1999 | Kinoshita | 384/441 |
| 6,105,739 A * | 8/2000 | Deppert | 188/322.17 |
| 6,113,275 A * | 9/2000 | Blase | 384/296 |
| 6,371,519 B1 * | 4/2002 | Jurik et al. | 280/777 |
| 6,485,180 B2 * | 11/2002 | Mena | 384/222 |
| 7,220,056 B2 * | 5/2007 | Kubota et al. | 384/215 |
| 2005/0087970 A1 * | 4/2005 | Ulintz | 280/775 |
| 2005/0225903 A1 * | 10/2005 | Sprankle et al. | 360/264.3 |
| 2007/0137378 A1 * | 6/2007 | Bastein et al. | 74/493 |

* cited by examiner

SLEEVE BEARING FOR COLLAPSIBLE STEERING COLUMN

FIELD OF THE INVENTION

The invention relates to a telescopically collapsible vehicular steering column assembly, and more particularly toward such a column assembly having inner and outer shaft tubes between which the sliding fit can be tuned for optimal sliding performance and stiffness characteristics.

BACKGROUND OF THE INVENTION

Many vehicles, and automobiles in particular, are provided with a steering column assembly in which a steering wheel is supported on a free end to receive manual rotary inputs from an operator. The steering column assembly is often designed to absorb the impact energy in a collision, by collapsing in response to an overwhelming compressive force as received by the body of the vehicular operator. Quite often, the collapsing mechanism in a steering column assembly is accomplished through a sliding fit arranged between inner and outer shaft tubes in the column assembly. During a collision, the outer shaft tube collapses over the inner shaft tube, or vice versa, with appropriate energy absorbing devices gradually arresting movement to help cushion the impact forces.

The sliding phenomenon between the inner and outer shaft tubes can be designed to occur only during an emergency collapse condition, or can be designed as part of a telescopic adjustment feature of the steering wheel. In either situation, a bushing is provided between the inner and outer telescoping shaft tubes to establish a smooth journaled interface. Commonly, the bushing is molded in place between the inner and outer shaft tubes to perfect a custom fit. Such molded-in-place bushings have a drawback in that the quality of the sliding fit between the inner and outer shaft tubes varies in relation to the instantaneous injection molding pressure at the time of the overmolding process. Because this injection pressure is difficult to control in a high production manufacturing setting, substantial variability may exist from one column assembly to the next. This variability can lead to a range of characteristics in the steering column assembly, such as in the collapse force resistance, vibrational frequency and/or stiffness of the assembled column.

Accordingly, there is a need for an improved bushing assembly placed between the inner and outer shaft tubes in a telescopically collapsible vehicular column assembly in which the resulting steering column characteristics can be carefully controlled and readily optimized.

SUMMARY OF THE INVENTION AND ADVANTAGES

A telescopically collapsible vehicular steering column assembly comprises an outer shaft tube defining a longitudinal axis. The outer shaft tube presents an axially extending receiving chamber. An inner shaft tube includes a guide head axially slideably disposed within the receiving chamber of the outer shaft tube. A steering wheel is operatively carried on a free end of one of the outer and inner shaft tubes. In a well-known way, a steering shaft connected to the steering wheel extends through the outer and inner shaft tubes and is supported for rotation about the longitudinal axis for transmitting rotary motion from the steering wheel to one or more steered elements, such as the front wheels in an automobile. A bushing is disposed between the guide head and the receiving chamber for facilitating telescopic relative sliding motion between the outer and inner shaft tubes. The bushing includes a generally annular journal bearing in sliding contact with one of the guide head and the receiving chamber. The bushing further includes a radially biased clearance compensator for applying a radial force to the journal bearing to fill any clear space and thereby improve the sliding fit between the inner and outer shaft tubes.

According to another aspect of the invention, a method is provided for tuning the sliding fit between the inner and outer shaft tubes in a telescopically collapsible vehicular steering column assembly. The method comprises the steps of forming an axially extending receiving chamber in an outer shaft tube, forming a guide head on the inner shaft tube, forming a bushing as a loose piece article of manufacture, the bushing including at least one generally annular journal bearing supported in a carrier body and an expandable clearance compensator extending from the carrier body, inserting the bushing into the receiving chamber, and axially inserting the guide head of the inner shaft tube into the receiving chamber of the outer shaft tube such that the journal bearing is placed into sliding contact with the guide head. The step of forming a bushing includes varying the dimensional attributes and/or position of the clearance compensator relative to the carrier body to optimize a characteristic of the steering column assembly.

The invention allows various aspects or characteristics of the steering column assembly to be tuned for optimal performance. For example, the stiffness of the column assembly can be tuned with precision by making a design adjustment in the size or location of the clearance compensator. Furthermore, the invention replaces the prior art process of plastic injection to remove lash in the bushing, in which a relatively wide range of variability was introduced into the axial sliding fit between the inner and outer shaft tubes. By contrast, the subject invention provides a highly controllable sliding fit between the inner and outer shaft tubes for improved consistency in the collapse load. The invention is readily adaptable to numerous configurations and can be introduced into various steering column assembly designs without added complexity. Additionally, the subject invention provides a lower cost method of establishing a controlled sliding fit between the inner and outer shaft tubes in a telescopically collapsible vehicular column assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
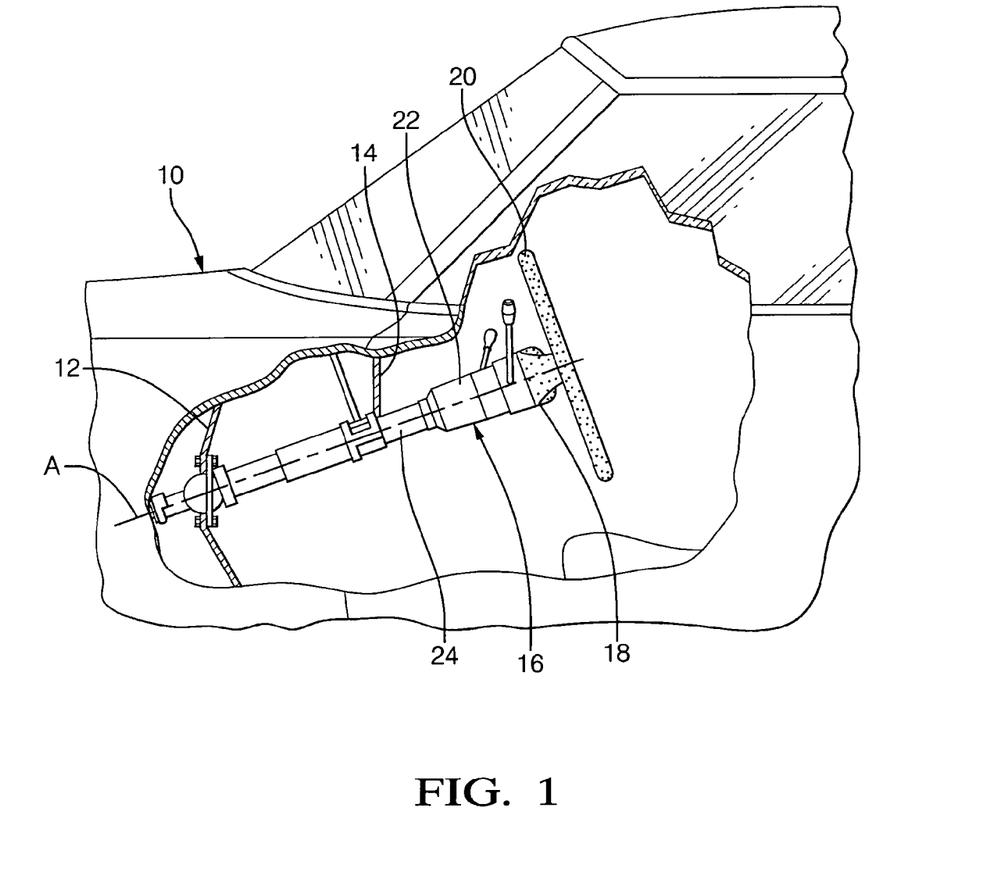
FIG. 1 is a fragmentary side view of a portion of a passenger vehicle with parts broken away to illustrate the general location of a steering column assembly made in accordance with the invention.

Referring to the figures, wherein like numerals indicate like or corresponding parts throughout the several views, a representation of a typical passenger compartment in a motor vehicle is generally indicated at 10 in FIG. 1. The motor vehicle 10 includes the typical firewall 12 and dashboard structure 14 which together form a part of the vehicle body. A vehicular steering column assembly is generally indicated at 16. The steering column assembly 16 may be supported at multiple points upon the vehicle body such as, in the example of FIG. 1, between the firewall 12 and under the dashboard 14. Other support arrangements are of course possible. The steering column assembly 16 may be of the non-adjustable type, or of the type which can be adjusted by tilt, by rake, and/or by telescoping movement. Adjacent an upper free end 18 of the steering column 16 is provided a steering wheel 20.

Figure 2:
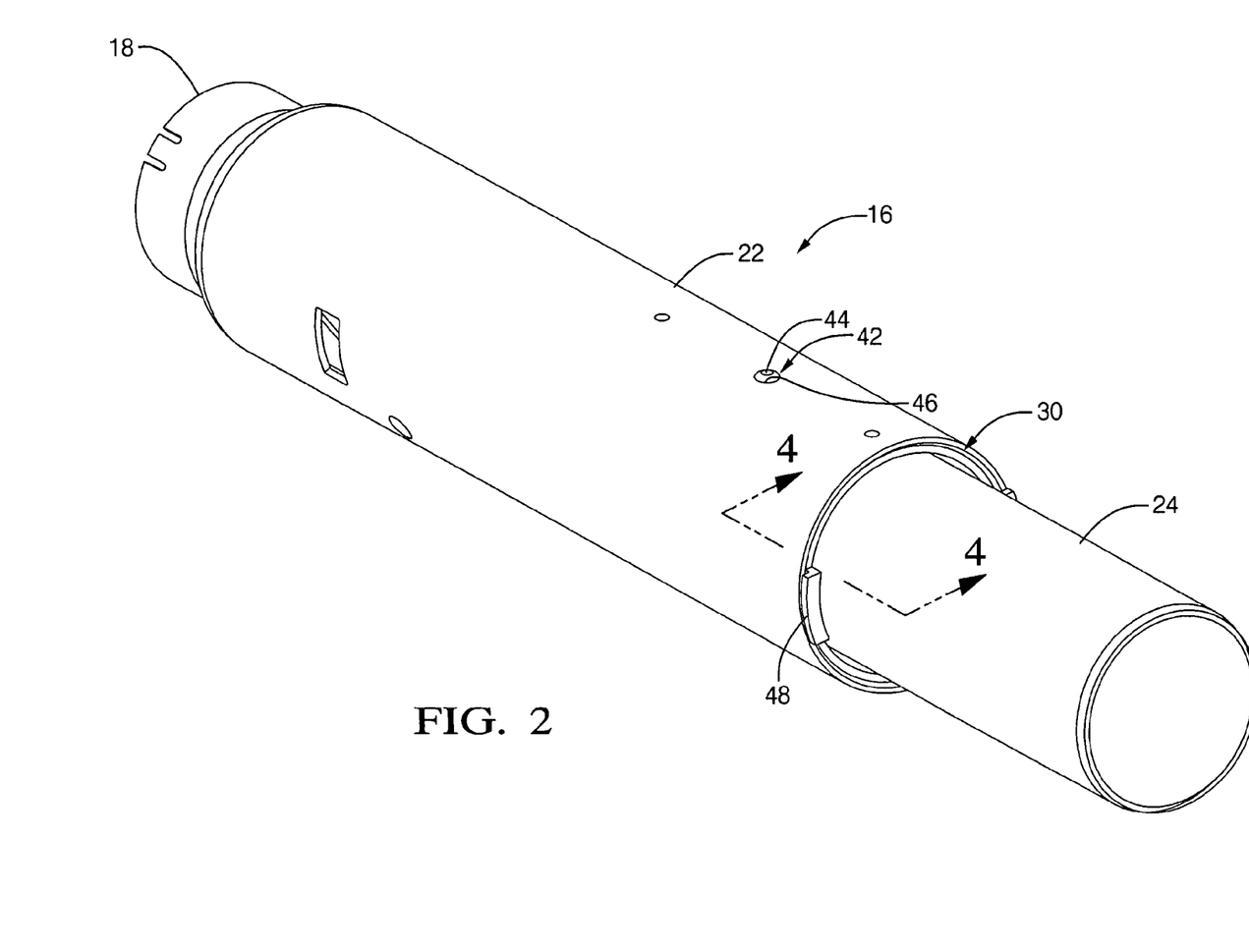
FIG. 2 is a perspective view of an outer and inner shaft tube of the steering column assembly including a bushing according to the subject invention disposed therebetween.

Referring to FIG. 2, the steering column assembly 16 is shown including an outer shaft tube 22 and an inner shaft tube 24. In the example illustrated, the outer shaft tube 22 terminates at the upper free end 18 and there carries the steering wheel 20. However, these positions can be reversed with the upper free end 18 being formed as the terminal end of the inner shaft tube 24 and the steering wheel 20 carried on the inner shaft tube 24.

The outer 22 and inner 24 shaft tubes are coaxially arranged, with a longitudinal axis A forming a natural centerline of the two components. The outer shaft tube 22 has an axially extending receiving chamber 26. A complimentary guide head 28 is formed on the inner shaft tube 24 and disposed for axial sliding movement within the receiving chamber 26 of the outer shaft tube 22. The receiving chamber 26 can be the full length of the outer tube 22 and comprises that part of the outer tube 22 in which the guide head 28 slides. The guide head 28, on the other hand, is that part of the inner tube 24 that is received into the receiving chamber 26. Typically, the guide head 28 will be surface finished to provide a smooth sliding interface.

Figure 3:
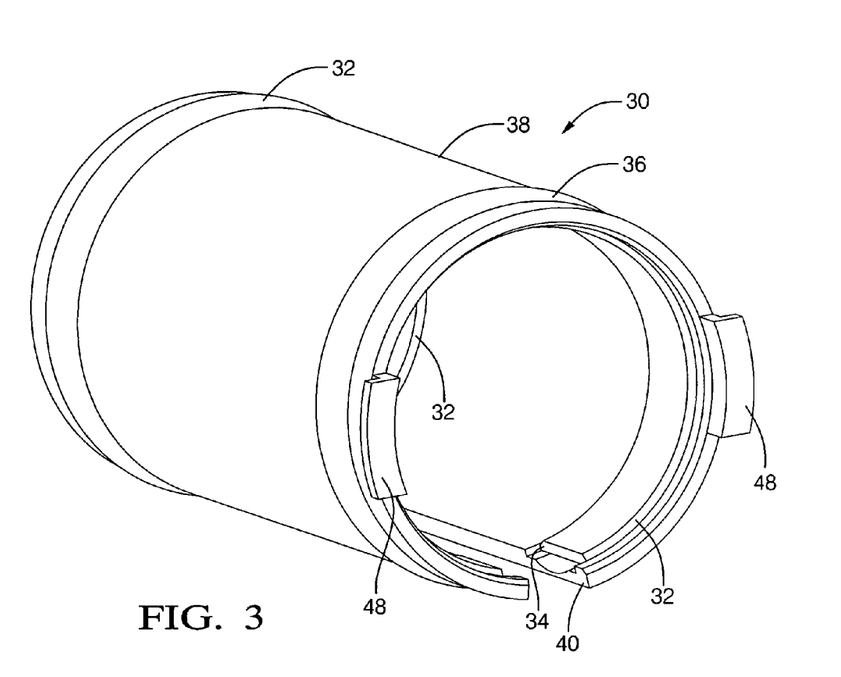
FIG. 3 is a perspective view of a bushing according to the subject invention.

A bushing, generally indicated at 30, is pre-formed as a loose piece article of manufacture. The bushing 30 is disposed between the guide head 28 and the receiving chamber 26 for facilitating axially telescopic relative sliding motion between the outer 22 and inner 24 shaft tubes. That is, the bushing 30 functions like a linear sliding plain bearing to smooth and control the telescoping motion of the inner shaft tube 24 relative to the outer shaft tube 22. The bushing 30 includes at least one, but preferably two axially spaced, generally annular journal bearings 32 in sliding contact with the guide head 28 of the inner shaft tube 24. Alternatively, the journal bearings 32 could be disposed in sliding contact with the receiving chamber 26 of the outer shaft tube 22 and held fixed relative to the inner shaft tube 24. And, of course, other sliding configurations are possible. However, in the embodiments illustrated in the accompanying figures, the journal bearings 32 in each case are fixed relative to the outer shaft tube 22 and slideably carry the inner shaft tube 24 during telescopically collapsible movement. The journal bearings 32 can be made from any suitable material, but in the preferred embodiment comprise a steel-backed polytetrofluoroethylene (PTFE) material, which provides good structural rigidity, a degree of resiliency, and superior lubricity and abrasion resistance.

The journal bearings 32 take the form of a split-ring design with a small gap 34 allowing circumferential compressibility. The bushing 30 further includes a radially biased clearance compensator 36 for applying a radial force against the journal bearings 32, thus pressing them into the inner shaft tube 24. The clearance compensator 36 acts to fill any clear space, i.e., lash, and thereby improve the sliding fit between the inner 24 and outer 22 shaft tubes. The clearance compensators 36 can take many forms, but in the embodiments illustrated includes at least one, but preferably two axially spaced clearance compensators 36 each being positioned axially proximate a respective one of the journal bearings 32. That is, the clearance compensators 36 react against the wall of the receiving chamber 26 to apply a compressive force against the journal bearings 32 thus pressing them into firm contact with the inner shaft tube 24. By placing the clearance compensators 36 axially proximate the respective journal bearings 32, bending moments are reduced within the bushing 30 and thereby provide better control of stresses within the assembly.

A carrier body 38 interconnects the journal bearings 32 and the clearance compensators 36. The carrier body 38 may be made from any suitable material, such as a plastic injection compound. The carrier body 38 is generally tubular and includes a longitudinally extending separation 40 which coincides with the gaps 34 in the journal bearings 32. The separation 40 provides a degree of spring-like compressibility for the bushing 30 so that it can be manufactured slightly oversize in diameter and then pressed into the receiving chamber 36. Under the resilient spring back action of the journal bearings 32 and inherent resiliency in the carrier body 38, the bushing 30 is thus held in a working position in the receiving chamber 26.

A locator 42 can be integrated into the bushing 30 for establishing a predetermined orientation, i.e., working position, of the bushing 30 within the receiving chamber 26. The locator 42 interacts with a corresponding feature in the outer shaft tube 22 to provide feedback indicating that the predetermined orientation has been achieved. For example, the locator 42 may comprise a button 44 extending radially from the carrier body 38. The button 44 seats within a recess 46 when the bushing 30 reaches its predetermined orientation, as shown in FIG. 2. Alternatively, or additionally, the locator 42 may comprise a pair of flanges 48 which abut the end of the outer shaft tube 22 to thus limit penetration of the bushing 30 into the receiving chamber 26 and help establish the predetermined orientation. The locator 42 provides one method of fixing the bushing 30 within the receiving chamber 26 of the outer shaft tube 22 so that it is held in the predetermined orientation during a collapse event of the steering column assembly 16.

Figure 4:
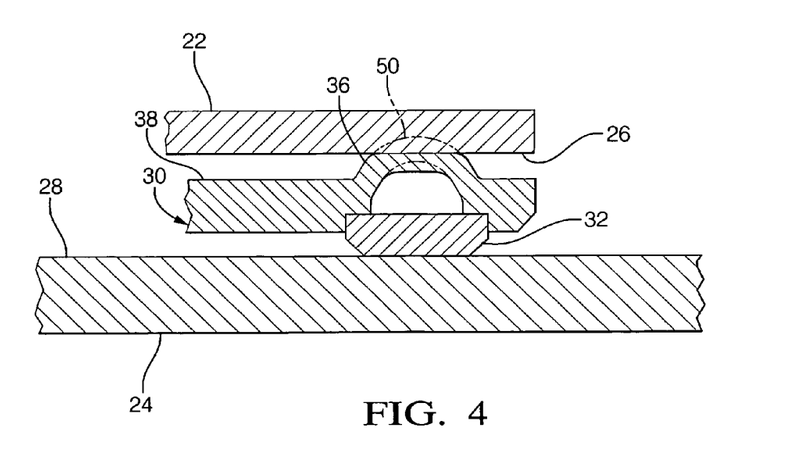
FIG. 4 is a fragmentary cross-sectional view taken generally along lines 4-4 in FIG. 2.

Referring again to the clearance compensator 36, it is shown in FIGS. 3 and 4 taking the form of an annular rib 50 extending proud from each end of the carrier body 38. The rib 50 has a hollow cross-section with a resiliently compressible crown which yields slightly under the expanding force of the inserted bushing 30 and perhaps additional expanding force exerted by the guide head 28. The hollow interior of the rib 50 provides a clearance space into which the crown can compress as needed. This resilient yielding of the crown of the annular rib 50 provides a reaction force pressing the journal bearings 32 into a controlled pressing contact against the inner shaft tube 24. By varying the dimensional attributes and/or the position of the annual ribs 50, it is possible to optimize the reaction force characteristics exhibited by the bushing 30. With this, the characteristics of the steering column 16 can be tuned to achieve optimal stiffness and/or vibrational responsiveness. By adjusting the compressibility of the annual ribs 50 through design changes in the manufacturing parameters, the sliding fit between the inner 24 and outer 22 shaft tubes can be carefully controlled.

Figure 5:
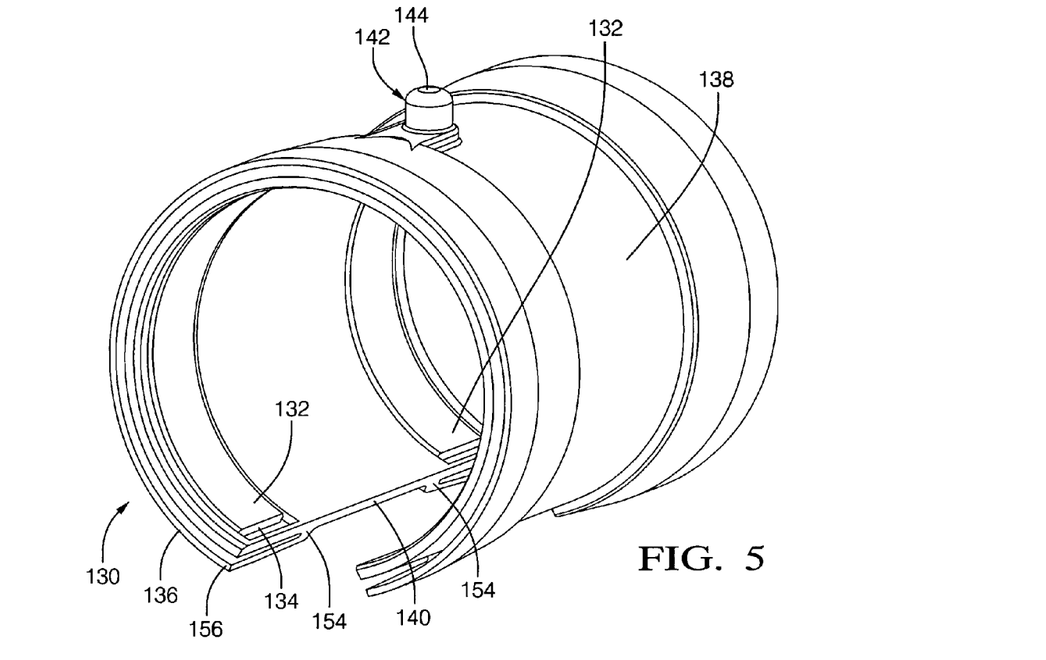
FIG. 5 is a perspective view of a first alternative embodiment of the bushing.
Figure 6:
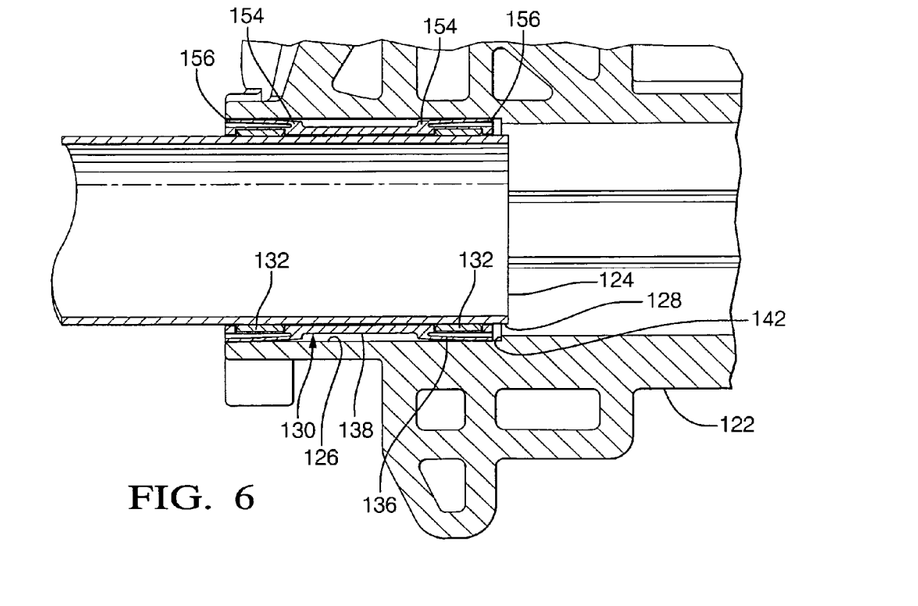
FIG. 6 is an assembly view taken in longitudinal cross-section showing the alternative bushing of FIG. 5 disposed in an operative condition between an inner and outer shaft tube.
Figure 7:
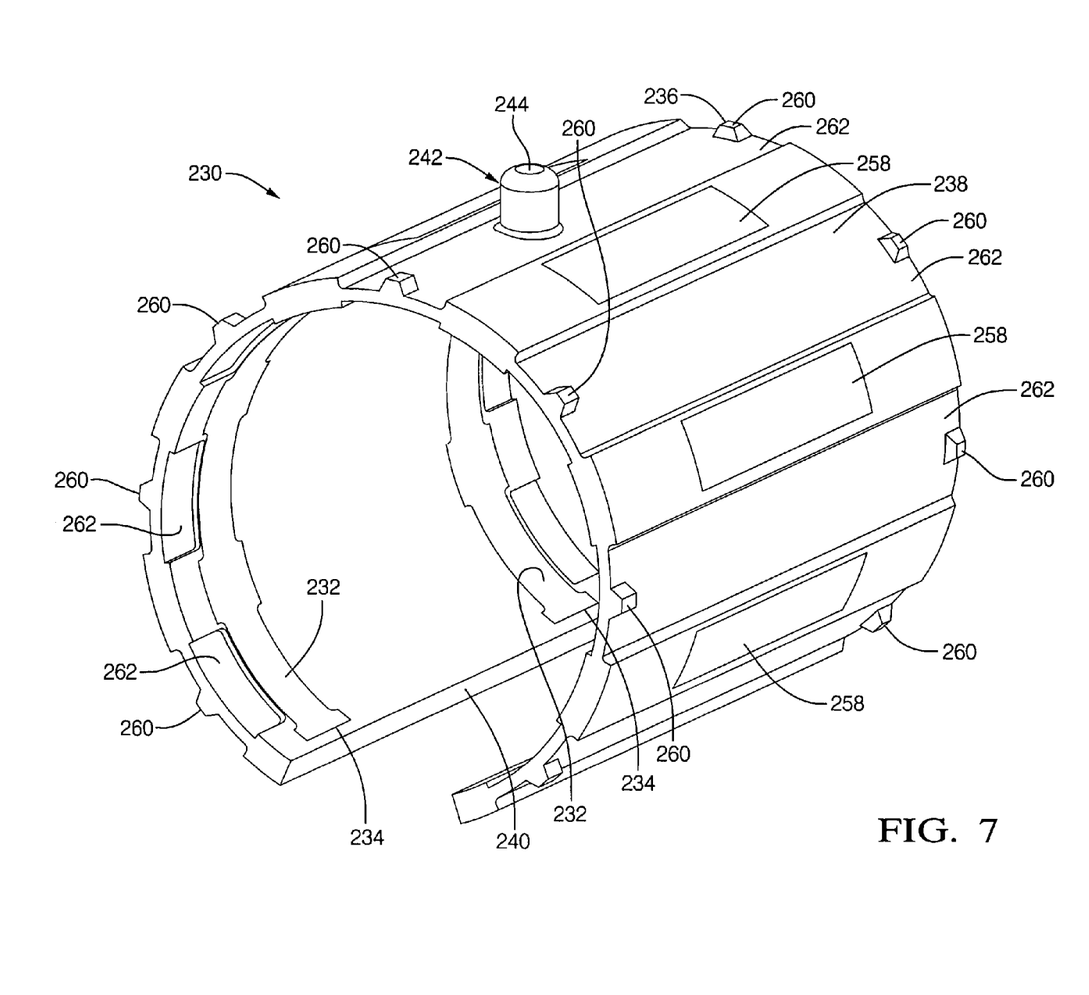
FIG. 7 is a perspective view of a second alternative embodiment of the subject bushing.
Figure 8:
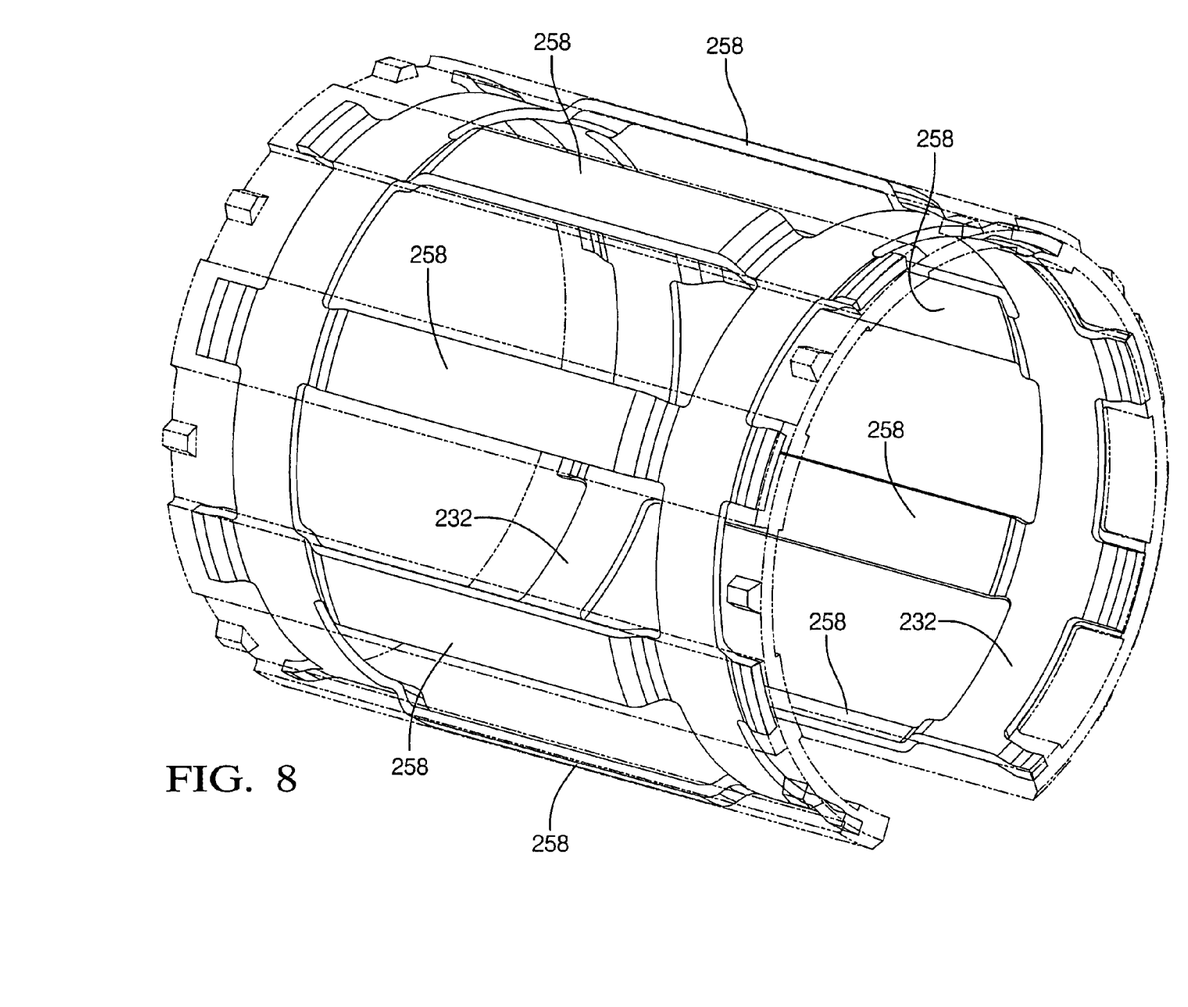
FIG. 8 is a perspective view of the journal bearings and tie bars of the bushing embodiment in FIG. 7.
Figure 9:
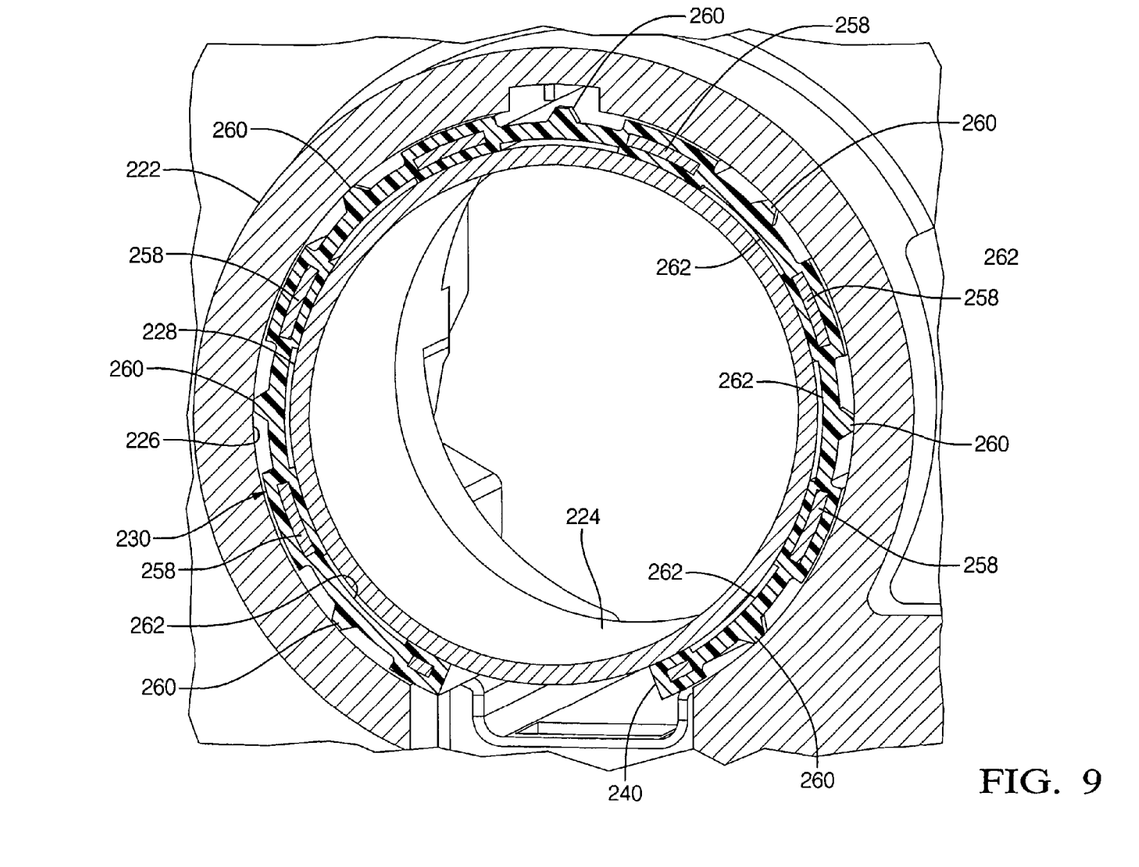
FIG. 9 is a transverse cross-sectional view of the bushing of FIG. 7 shown in an assembled condition.
Figure 10:
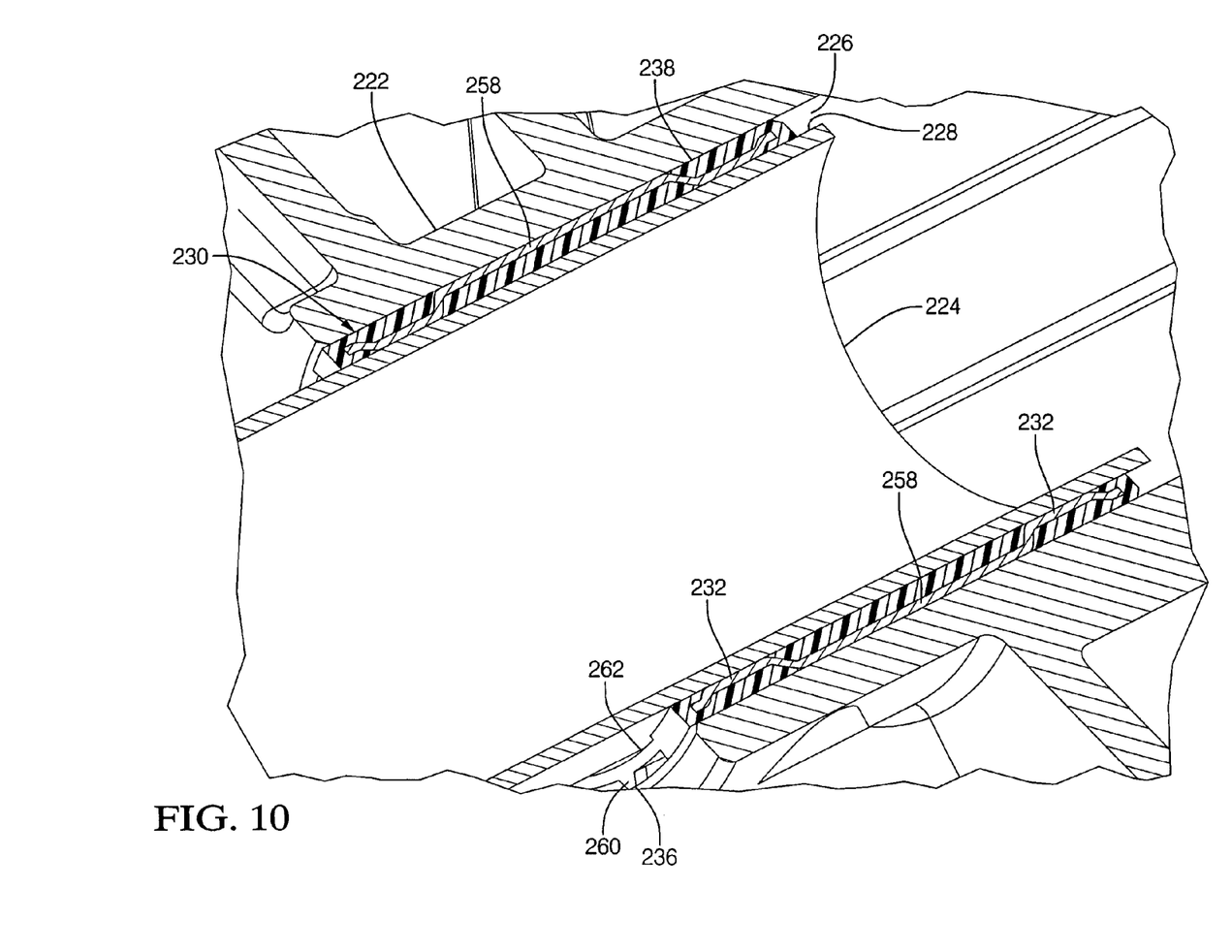
FIG. 10 is a cross-section taken in the longitudinal direction of the second alternative bushing of FIG. 7 shown in an assembled condition between the inner and outer shaft tubes.

Referring now to FIGS. 5 and 6, an alternative embodiment of the bushing 130 is shown. For convenience, like reference numerals from the preceding embodiment will be used with a "1" prefix to distinguish this alternative design. The bushing 130 includes clearance compensators 136 at each end, overlying the included journal bearings 132. The journal bearings 132 have a gap 134 therein. Here, the clearance compensators 136 each comprise a skirt having an anchored end 154 that adjoins directly to the carrier body 138. The carrier body 138 includes a longitudinally extending separation 140 which coincides with the gaps 134 in the journal bearings 132. The skirt also has a free end 156 that extends in somewhat cantilever fashion from the anchored end 154. The free end 156 is radially compressible and provides a resilient spring-like action with which to establish the radial reaction force necessary to remove lash between the inner 124 and outer 122 shaft tubes. The outer shaft tube 122 has an axially extending receiving chamber 126. A guide head 128 is formed on the inner shaft tube 124. A clearance space under the free end 156 provides room for the free end 156 to flex inwardly as needed. A locator 242 can be integrated into the bushing 230 for establishing a predetermined orientation of the bushing 230. According to this embodiment, the dimensional attributes of the skirt can be varied during the design and fabrication phases to optimize the various characteristics of the steering column assembly 16. For example, the length and/or thickness of the skirt can be changed to affect its resilient properties. FIG. 6 illustrates an alternative embodiment of the locator 142 which, in this case, includes a shoulder formed in the receiving chamber 26. The locator may comprise a button 144. The innermost clearance compensator 136 abuts the shoulder to signify the axial component of the predetermined orientation of the bushing 130 has been achieved.

FIGS. 7-10 represent a second alternative embodiment of the bushing 230. Here, like reference numerals from preceding embodiments are used to describe corresponding parts and features, but with the prefix "2" serving to distinguish this second alternative embodiment. In this case, the bushing 230 includes axially extending tie bars 258 at least partially embedded in the carrier body 238. Further, the journal bearings 232 have a gap 234 therein. The tie bars 258, like the journal bearings 232, are made of steel-backed PTFE. This cage-like pre-form is then overmolded as the carrier body 238 is developed. The carrier body 238 includes a longitudinally extending separation 240 which coincides with the gaps 234 in the journal bearings 232. In this second alternative embodiment, the clearance compensator 236 comprises an array of nubs 260 spaced circumferentially about each end of the carrier body 238. The nubs 260 are formed in thinned sections 262 of the carrier body 238 which themselves provide enhanced flexibility contributing to the radial resiliency needed to accomplish the purpose of the clearance compensator 236. The thinned sections 262 extend partially to the inner diameter of the bushing 230 to provide the necessary compression clearance. Thus, when the bushing 230 is inserted into the receiving chamber 226, the nubs 260, which stand proud of the remainder of the bushing 230, engage the receiving chamber 226. The thinned sections 262 have flexibility, allowing the bushing 230 to adapt precisely to the curvature of the receiving chamber 226 and to fill any clear space thereby removing system lash. The thinned sections 262, cooperating with the nubs 260, thus apply a radial force to the journal bearings 232 to control the sliding fit between the inner 224 and outer 222 shaft tubes. A guide head 228 is formed on the inner shaft tube 224. By altering the dimensional attributes of the nubs 260 and/or the thinned sections 262, the characteristics of the steering column assembly 216 can be optimized for stiffness, sliding fit, or other values.

While the invention has been described with reference to exemplary embodiments, it will be understood by those skilled in the art that various changes may be made and equivalents may be substituted for elements thereof without departing from the scope of the invention. For example, the clearance compensator can take a form other than one of the three embodiments herein described. Similarly, the configuration and material composition of the journal bearings and carrier body are readily adaptable to other applications. In addition, many modifications may be made to adapt a particular situation or material to the teachings of the invention without departing from the essential scope thereof. Therefore, it is intended that the invention not be limited to the particular embodiments disclosed herein for carrying out this invention, but that the invention will include all embodiments falling within the scope of the appended claims.

What is claimed is:

1. A telescopically collapsible vehicular steering column assembly comprising: an outer shaft tube defining a longitudinal axis, said outer shaft tube presenting an axially extending receiving chamber;

an inner shaft tube including a guide head axially, slideably disposed within said receiving chamber of said outer shaft tube; and a bushing disposed between said guide head and said receiving chamber, telescopic relative sliding motion between said outer and inner shaft tubes being facilitated by said bushing, said bushing having a carrier body, a plurality of axially spaced, generally annular journal bearings, two of said bearings being disposed proximate respective ends of said carrier body, and a plurality of radially biased clearance compensators, each of said clearance compensators being positioned axially proximate a respective one of said journal bearings, said bushing defining a longitudinal separation extending along an entire length of said bushing and defining a continuous gap through said carrier body, clearance compensators, and journal bearings, each said clearance compensator comprising a plurality of nubs extending outwardly from said carrier body when non-compressed, the nubs being disposed and spaced circumferentially about each end of said carrier body, each nub being frustum-shaped and formed in a thinned section of said carrier body, said generally annular journal bearings contacting said carrier body, said generally annular journal bearings in sliding contact with said guide head, such that a radial force is applied by said clearance compensator against said journal bearings to remove lash between said inner and outer shaft tubes.

2. A steering column assembly as set forth in claim 1 wherein said bushing includes at least two axially spaced journal bearings and at least two axially spaced clearance compensators.

3. A steering column assembly as set forth in claim 2 wherein each of said clearance compensators positioned axially proximate a respective one of said journal bearings.

4. A steering column assembly as set forth in claim 2 wherein said carrier body interconnecting said journal bearings, said clearance compensators extending from said carrier body.

5. A steering column assembly as set forth in claim 4 wherein said journal bearings slideably engage said guide head of said inner shaft tube, and said clearance compensators extend radially outwardly from said carrier body into pressing engagement with said receiving chamber.

6. A steering column assembly as set forth in claim 5 wherein said carrier body is generally tubular.

7. A steering column assembly as set forth in claim 6 wherein said bushing having a pre-assembled, free state condition in which said brushing has an outer diameter greater than an inner diameter of said receiving chamber.

8. A steering column assembly as set forth in claim 5 wherein said bushing is fixed in said receiving chamber of said outer shaft tube.

9. A steering column assembly as set forth in claim 8 wherein said bushing includes a locator for establishing a predetermined orientation of said bushing within said receiving chamber, said locator interacting with a recess in said outer shaft tube.

10. A steering column assembly as set forth in claim 9 wherein said locator includes a button extending radially from said carrier body, said button being seated in said recess in said receiving chamber when said bushing is in its said predetermined orientation.

11. A steering column assembly as set forth in claim 4 wherein said bushing includes axially extending tie bars at least partially embedded in said carrier body.

12. A steering column assembly as set forth in claim 1 wherein said journal bearings comprises steel-backed polytetrafluoroethylene.

13. The telescopically collapsible vehicular steering column assembly of claim 1, wherein each nub being frustum-shaped is a truncated pyramid-shaped nub.

14. A bushing for facilitating telescopic relative motion and providing support between outer and inner shaft tubes of a telescopically collapsible vehicular steering column assembly, said bushing having a carrier body, a plurality of radially biased clearance compensators, a plurality of axially spaced generally annular journal bearings, said bushing defining a longitudinal separation extending along an entire length of said bushing and defining a continuous gap through said carrier body, clearance compensator, and journal bearing;

said clearance compensator comprising a plurality of nubs extending outwardly from said carrier body when non-compressed, the nubs being disposed and spaced circumferentially about each end of said carrier body, each nub being frustum-shaped, said generally annular journal bearing being coupled to the carrier body, said bushing having a diameter in a free-state condition that is reduced in response to said clearance compensator being subjected to a compressive force reactive to its radially outward bias, two of said bearings being disposed proximate respective ends of said carrier body, each of said clearance compensators being positioned axially proximate a respective one of said-journal bearings, said bushing defining a longitudinal separation extending along an entire length of said bushing and defining a continuous gap through said carrier body, clearance compensators, and journal bearings, each said clearance compensator comprising a plurality of nubs extending outwardly from said carrier body when non-compressed, the nubs being disposed and spaced circumferentially about each end of said carrier body, each nub being frustum-shaped and formed in a thinned section of said carrier body.

15. A bushing as set forth in claim 14, wherein said bushing includes at least two axially spaced journal bearings and at least two axially spaced clearance compensators.

16. A bushing as set forth in claim 15, wherein each of said clearance compensators is positioned axially proximate a respective one of said journal bearings.

17. A bushing as set forth in claim 15, wherein said bushing includes axially extending tie bars at least partially embedded in said carrier body.

18. A bushing as set forth in claim 17, wherein said tie bars comprise steel-backed polytetrafluoro ethylene.

19. A bushing as set forth in claim 14, wherein said journal bearings comprises steel-backed polytetrafluoroethylene.

20. A bushing as set forth in claim 14, wherein said bushing includes a locator, a predetermined orientation of said bushing being established by interaction of said locator with a corresponding feature in one of the inner and outer shaft tubes during assembly of said bushing thereto.

21. A telescopically collapsible vehicular steering column assembly comprising: an outer shaft tube defining a longitudinal axis, said outer shaft tube presenting an axially extending receiving chamber;

an inner shaft tube including a guide head axially, slideably disposed within said receiving chamber of said outer shaft tube; and a bushing disposed between said guide head and said receiving chamber, telescopic relative sliding motion between said outer and inner shaft tubes being facilitated by said bushing, said bushing having a carrier body, first and second clearance compensators, and first and second axially spaced journal bearings, said first and second journal bearings each being disposed proximate respective ends of said carrier body, each of said first and second clearance compensators being positioned axially proximate a respective one of said-journal bearings, said bushing defining a longitudinal separation extending along an entire length of said bushing and defining a continuous gap through said carrier body, clearance compensators, and journal bearings, said first and second clearance compensators each comprising a plurality of nubs extending outwardly from said carrier body when non-compressed, the nubs being disposed and spaced circumferentially about each end of said carrier body and formed in a thinned section of said carrier body, each nub being frustum-shaped, said first journal bearing being coupled to said carrier body, and said second journal bearing being coupled to said carrier body, said first and second journal bearings in sliding contact with said guide head, such that a radial force is applied by said first and second clearance compensators against said first and second journal bearings, respectively, to remove lash between said inner and outer shaft tubes.

* * * * *